United States Patent Office 3,017,370
Patented Jan. 16, 1962

3,017,370
MAGNESIA MODIFIED KAOLIN CATALYST
George Alexander Mills, Swarthmore, Pa., assignor to Houdry Process Corporation, Wilmington, Del., a corporation of Delaware
No Drawing. Filed Mar. 3, 1959, Ser. No. 796,753
2 Claims. (Cl. 252—450)

This invention relates to methods for the preparation of kaolin catalyst particles having commercially acceptable attrition, selectivity and stability characteristics, and possessing a controlled activity within a range lower than that of conventional kaolin catalyst particles.

Heretofore, kaolin catalyst particles suitable for the cracking of hydrocarbons boiling above the gasoline range for the formation of high octane gasoline have been proposed. Substantially all cracking catalyst particles were formerly manufactured from clays such as montmorillonite or haloysite or bentonite clays, instead of from kaolin. Only recently was industrial production of kaolin cracking catalyst achieved. This accomplishment was attained by a method comprising: mixing an aqueous sulfuric solution of high concentration (e.g., from about 70% to about 98%) with pulverized kaolin powder to provide a paste; extruding the paste to form firm pellets consisting of a mixture of relatively concentrated sulfuric acid and kaolin; aging the particles at a temperature of about 300° F. for about 4 hours, such aging step sometimes being designated as a "denning" step, the sulfuric acid thereby reacting with components (e.g. alumina) of the kaolin; and subjecting the denned particles to an elevated temperature at conditions effectively decomposing all sulfate compounds by volatilizing substantially all of the oxides of sulfur from the particles. In all modifications of the so-called sulfate volatilization procedures, the analysis of the desulfated particle shows the same composition as the kaolin starting material, thus differing greatly from any of the leaching procedures intended to remove selectively certain components from the clay. In preferred embodiments of the sulfate volatilization procedure, the oxides of sulfur are volatilized from the denned particles at an elevated temperature in the presence of a gas mixture comprising steam and at least 10% hydrogen.

Commercially acceptable yields of gasoline may be obtained by the partial conversion of gas oil in a cracker having a gravitating bed of granular cracking catalyst particles. Such cracking catalyst bed gravitates through a plurality of zones, including a cracking zone and regeneration zone in which the carbonaceous deposit is burned from the catalyst particles. Much flexibility has been designed into most such crackers.

A cracking stock can be cracked thermally to produce much gas and some gasoline of relatively low octane. The success of catalytic cracking was attributable to its ability to provide higher octane number gasoline and more selective conversion to gasoline. In order to achieve such selectivity, and to minimize competitive thermal cracking reactions, it was the custom for many years to conduct catalytic cracking at the lowest possible temperature. For example, early literature on catalytic cracking suggests low cracking temperatures such as 830° F. or 850° F. However, as the demand for higher and higher octane number gasoline increased, catalytic cracking was conducted at moderately high temperatures (e.g. 875–900° F.) and competitive thermal cracking was tolerated in the catalytic cracking zone in order to achieve a higher octane number product. So long as the catalytic crackers were operated at such moderately high temperatures (e.g. 875–900° F.), high activity catalyst was desirable. Recently, however, the demand for gasoline of extremely high octane number has been so great that refiners have been willing to accept the loss of yield incident to catalytic cracking at temperatures significantly higher than was formerly practiced. In catalytic cracking at such elevated temperatures (e.g. 940° F., or within the 925–975° F. range), the selectivity for gasoline production and/or the gasoline to gas ratio are unfavorable using a very active catalyst but are much more favorable using a catalyst having a moderate activity. In any catalytic cracking, the selectivity and gasoline to gas ratio decline as the extent of conversion increases. As the cracking temperature is increased, the extent of conversion can be kept constant by lowering the depth of the gravitating bed, thereby increasing the space rate. Each unit for catalytically cracking gas oil has been designed to permit a wide range of flexibility concerning operating conditions, but for each unit, certain minimum bed depths have also been incorporated in the design. Such flexibility did not contemplate, for example, operation at 975° using a 45 Activity Index catalyst, but assumed that the upper limits of temperature and catalyst activity would be closer to what was then commercial practice.

The fresh catalyst introduced into a gravitating bed cracker is customarily of significantly higher activity than the equilibrium catalyst, and the catalyst replacement rate has generally been a variable which permitted the use of catalyst of any activity higher than that of the equilibrium catalyst. However, the catalyst inventory must be maintained, and the rate of catalyst replacement cannot be reduced below that necessary for making up losses due to attrition. In the early days of gravitating bed catalytic cracking, the catalyst replacement rates necessary to maintain an efficient activity in the equilibrium catalyst were far above those required to make up attrition losses. However, the stability of catalyst has been so improved that catalyst replacement rates approximately equivalent to attrition losses have been possible, thus helping to create situations requiring the use of catalyst granules of modified activity, especially for operation at cracking temperatures within the range from 925° F. to 975° F. At such elevated temperatures, the quantity of coke deposited in a fresh catalyst granule of extremely high activity might be sufficient to promote the sintering of the granule during the coke-burning step, and the troubles incident to hot spots in the kiln have stimulated interest in the use of less active fresh catalyst particles for crackers operating in the 925–975° F. range. It is more efficient to provide catalyst of reduced activity for such elevated temperature operation than it is to rebuild the cracker to permit a higher space rate. Although most gravitating bed cracking units may never require the catalyst of reduced activity, there has already been the demand for such reduced activity catalyst from the operators of some gravitating bed crackers. Most refiners have preferred kaolin catalyst granules having exceptionally high activity. However, some refiners have shown interest in kaolin catalyst granules modified to possess merely standard activity.

Numerous efforts were made to modify the method of manufacturing kaolin catalyst to achieve reduced activity without impairing other desirable properties. In a previously described method for making kaolin catalyst having special advantages such as reduced activity, about 0.2 mol of magnesia is premixed into 1 mol of phosphoric acid, and the reaction product is added to 7 mols of sulfuric acid to provide a mixture employed at about 42% dosage in impregnating kaolin. As explained in the application of G. R. Bond, Jr., Serial No. 772,156, filed November 6, 1958, 21.6 g. of MgO are reacted with 259 g. of concentrated $H_3PO_4$, and the reaction product is mixed with 1 liter of 66° Bé. $H_2SO_4$ prior to treatment of 5 kg. of raw kaolin clay. Inasmuch as phosphoric acid is costly, continued efforts have been made to provide other methods for manufacturing kaolin catalyst particles possessing a lowered but desired activity by inclusion of a minor amount of magnesia therein. Said application, Serial No. 772,156, explains that attempts to prepare modified activity kaolin catalyst particles by mixing magnesium sulfate into the acid-kaolin paste produced commercially unsatisfactory particles.

In accordance with the present invention, there is provided a method of preparing kaolin catalyst particles possessing a commercially acceptable combination of a controlled activity, cracking selectivity, attrition resistance and advantageous stability which includes the steps of: pulverizing magnesium sulfate; dispersing the pulverized magnesium sulfate in a gas stream; preparing finely pulverized dry kaolin particles from raw kaolin; dispersing the finely pulverized kaolin particles in a gas stream; mixing the pulverized kaolin particles with sufficient pulverized magnesium sulfate particles to provide in the final calcined catalyst from about 0.25% to about 0.75% magnesia by blending the gaseous dispersion of kaolin and the gaseous dispersion of the magnesium sulfate; thereafter degassing the gaseous dispersion of the thus blended mixture; dispersing the blended mixture in concentrated sulfuric acid containing at least 90% sulfuric acid, the quantity of acid being as least sufficient to provide an extrudable mixture, whereby at least a portion of the magnesium sulfate is dissolved in the sulfuric acid and impregnated throughout kaolin; forming the mixture of kaolin, magnesium sulfate and sulfuric acid into particles having minimum dimensions within the range from 1 to 10 mm.; subjecting the 1–10 mm. particles of kaolin to the action of said sulfuric acid at a temperature of at least 220° F. for at least 3 hours; decomposing the sulfate compounds thus formed in the kaolin and volatilizing sulfur oxides from the kaolin by treatment with a gas stream at a temperature of at least 1100° F.; and treating the thus desulfated kaolin particles at a temperature of at least 1200° F. to convert the particles to cracking catalyst particles having less activity than kaolin catalyst particles free from the magnesia modifier, said cracking catalyst particles having a commercially acceptable combination of stability, activity and selectivity.

The invention is further described by reference to a plurality of examples.

EXAMPLE I

Raw kaolin was mined and separated from sand and gravel contaminants and was stored as a dry pulverized powder. The kaolin powder was dispersed in air in an air conveyor system and directed toward a feed hopper. Magnesium sulfate was pulverized and dispersed in an air stream. A minor stream of such air dispersed magnesium sulfate powder was injected into the major stream of air suspended kaolin stream at a rate providing in the final catalyst approximately 0.5% magnesium oxide. The mixture was passed to the feed hopper and deaerated and passed into a type of mixing apparatus known as a pugger. For each 100 pounds of magnesia-kaolin mixture, approximately 35 pounds of 98% sulfuric acid were added to form an extrudable paste, and the composition was thoroughly mixed in the pugger. This thick paste was extruded to form rods which were sliced into cylindrical pellets having a length approximately equal to diameter. The slightly plastic pellets had much greater cohesion than adhesion, and retained their individual particle characteristics without agglomeration during a treatment in a tumbling drum for several minutes. The edges of the cylindrical pellets were thus rounded to form nearly spherical particles. The spherical particles of the paste of sulfuric acid and magnesium sulfate modified kaolin were heated at about 300° F. for about 4 hours while immersed in a high boiling hydrocarbon oil. When thus given several hours of aging at the elevated temperature, the concentrated sulfuric acid reacted with some of the alumina content of the kaolin to form aluminum sulfate. Clay technologists have applied the term "denning" to such an aging step. Clay experts have considered the controlled aging of a clay mixture as a step in which the operator is "denning" the clay mixture, notwithstanding the remoteness of the operation from storage in a den or cave. The ingredients of the sulfuric acid impregnated clay reacted with each other during the denning step.

The excess oil was drained from the denned spheres of sulfuric acid treated kaolin, which were transferred to a heat treatment zone in which any residual oil was volatilized and in which the kaolin was heated to a temperature of about 1300° F. for a period of several hours. During a portion of the heat treatment at about 1300° F., a gas stream comprising about 50% steam, about 40% inert flue gas and about 10% hydrogen was passed through the bed of spherical kaolin particles to aid in the decomposition of the aluminum sulfate and magnesium sulfate. The desulfated particles then were heated for several hours in a stream of 100% flue gas at 1300° F. to stabilize surface area characteristics and to impart stability to the activity of the particles as catalyst for the cracking of gas oil to gasoline. A chemical analysis of the catalyst particle after the sulfation and desulfation treatments established that substantially the same components plus the added magnesia were present in the completed catalyst particle as in the initial kaolin mixture subjected to the sulfuric acid treatment. However, X-ray analysis established that there had been a modification of the crystal structure of the material by reason of the sulfation and desulfation. Moreover, the combined water content (that is, the quantity of material volatilizible at temperatures such as 1600° F.) was significantly less after the sulfation-desulfation steps than before such treatment. The physical properties of the magnesia-containing kaolin spheres successfully met the commercial specifications requiring an attrition resistance of at least 95% on the ball mill hardness test and an impact resistance of not more than 20 on the air jet hardness test. In the ball mill test, the granules are tumbled with stainless steel balls for one hour, and the percentage of particles not significantly reduced in size is noted. In the air jet test, the particles are agitated by a turbulent air jet in an inverted flask, and the percentage of off size particles is taken as a measure of the susceptibility of the particles to fracture by impact.

The magnesia-containing kaolin spheres were employed in a cracking unit designed to evaluate the activity of a cracking catalyst at standard conditions including the use of a standard gas oil feedstock at a temperature of 900° F. The results of this catalyst evaluation were expressed in terms of the space rate at which the catalyst provides 55 volume percent conversion at 900° F. at a ratio of 5 volumes of catalyst to 1 volume of oil. In this space rate test, the vapors of a standard gas oil (55–87 volume percent east Texas crude) at 900° F. were passed over suitable catalysts at various space rates (thereby attaining various conversions) and the data were plotted on graphs. The activity of said catalyst was evaluated from the space rate graph showing the relationship between volume percent conversion and the hourly rate at which a unit volume of gas oil was subjected to a unit volume of gas oil. At 55 volume percent conversion, the $C_5+$ gasoline (90 volume percent of which boils below 385° F.) constituted 38.6 volume percent of the feed, the $C_4$ hydrocarbons 14.2 volume percent of the feed, the $C_1$–$C_3$ hydrocarbons 7.5 weight percent of the feed and the hydrogen and coke 4.0 weight percent of the feed. The "space rate number" indicative of the space rate corresponding to 55% conversion was interpolated from the graph instead of adjusting the space rate experimentally to achieve the standard 55% conversion. The following observations are noted:

Table I

|  | Kaolin Spheres | Magnesia-Containing Kaolin Spheres |
|---|---|---|
| Unit Activity (S.R. for 55 vol. percent conversion) | 2.3 | 1.9 |
| F-1 Clear Octane | 93.3 | 94.5 |

The catalyst particles having an activity expressed as a 1.9 space rate were suitable for use in certain commercial cracking units, but catalyst particles having an activity expressed as a 2.3 space rate were excessively active for such commercial cracking units. Accordingly, the magnesia-containing kaolin spheres were suitable for use in such commercial cracking units, but the kaolin spheres free from such added magnesia were objectionably overactive and produce excessive coke at excessive conversion for such cracking units. Particular attention is directed to the fact that the octane number of the gasoline obtained by the use of the magnesia-containing kaolin spheres was higher than the octane number of the gasoline obtained using kaolin spheres.

EXAMPLE II

By a series of evaluations, a basis is established for the limitations necessary for obtaining satisfactory catalyst particles, including: the necessity for using magnesia corresponding to from about 0.25 to about 0.75% of the calcined catalyst particle; the necessity for using at least 70% and preferably 98% sulfuric acid in a dosage of at least 20% of the weight of the kaolin in preparing to extrude the particles having minimum dimensions within the range from 2 to 10 mm.; the necessity for subjecting the extruded particles in oil to a temperature of at least 300° F. for at least 3 hours; the necessity for including at least 10% hydrogen and at least 10% steam and a temperature of at least 1100° F. in desulfating the particles; and the necessity for treating the desulfated particles at at least 1200° F. to prepare desirable cracking catalyst particles.

Obviously many modifications and variations of the invention as hereinbefore set forth may be made without departing from the spirit and scope thereof, and therefore only such limitations should be imposed as are indicated in the appended claims.

What is claimed is:

1. The method of preparing kaolin catalyst particles possessing an advantageous combination of a controlled activity, cracking selectivity, attrition resistance and stability which includes the steps of: mixing pulverized kaolin particles with sufficient pulverized magnesium sulfate particles to provide from about 0.25% to about 0.75% magnesia on a calcined basis; dispersing the blended mixture in concentrated sulfuric acid whereby at least a portion of the magnesium sulfate is dissolved in the sulfuric acid and impregnated throughout each particle of kaolin; forming the mixture of kaolin, magnesium sulfate and sulfuric acid into particles having minimum dimensions of from 1 to 10 mm.; denning the particles; heating the denned particles in a gas stream to volatilize all sulfate therefrom; and calcining the desulfated particles to provide said cracking catalyst particles having said advantageous combination of controlled activity, cracking selectivity, attrition resistance and stability.

2. The method of preparing kaolin catalyst particles possessing an advantageous combination of a controlled activity, cracking selectivity, attrition resistance and stability which includes the steps of: pulverizing magnesium sulfate; dispersing pulverized magnesium sulfate in a gas stream; preparing finely pulverized dry kaolin particles from raw kaolin; dispersing the finely pulverized kaolin particles in a gas stream; mixing the pulverized kaolin particles with sufficient pulverized magnesium sulfate particles to provide from about 0.25% to about 0.75% magnesia on a calcined basis by blending the gaseous dispersion of kaolin and the gaseous dispersion of the magnesium sulfate; thereafter degassing the gaseous dispersion of the thus blended mixture; preparing a paste consisting of the blended mixture and concentrated sulfuric acid whereby at least a portion of the magnesium sulfate is dissolved in the sulfuric acid and impregnated throughout each particle of kaolin; forming the mixture of kaolin, magnesium sulfate and sulfuric acid into particles having minimum dimensions within the range from 1 to 10 mm.; subjecting the 1-10 mm. particles to a denning treatment comprising maintaining the particles at a temperature of at least 300° F. for at least 3 hours whereby the sulfuric acid reacts with the kaolin; volatilizing oxides of sulfur from the denned kaolin particles by treatment with a gaseous mixture containing at least 10% hydrogen and at least 10% steam at a temperature of at least 1100° F. to remove all sulfate from the particles and treating the thus desulfated kaolin particles at a temperature of at least 1200° F. to convert the particles to cracking catalyst particles having said advantageous combination of controlled activity, cracking selectivity, attrition resistance and stability.

References Cited in the file of this patent

UNITED STATES PATENTS

| 2,431,206 | Spicer et al. | Nov. 18, 1947 |
| 2,904,520 | Donovan et al. | Sept. 15, 1959 |